(12) United States Patent
Matsunaga et al.

(10) Patent No.: US 9,308,775 B2
(45) Date of Patent: Apr. 12, 2016

(54) BEARING DEVICE FOR WHEEL AND MANUFACTURING METHOD THEREFOR

(71) Applicants: Hiroshi Matsunaga, Shizuoka (JP); Masahiro Tosaji, Shizuoka (JP)

(72) Inventors: Hiroshi Matsunaga, Shizuoka (JP); Masahiro Tosaji, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/434,192

(22) PCT Filed: Sep. 13, 2013

(86) PCT No.: PCT/JP2013/074935
§ 371 (c)(1),
(2) Date: Apr. 8, 2015

(87) PCT Pub. No.: WO2014/057770
PCT Pub. Date: Apr. 17, 2014

(65) Prior Publication Data
US 2015/0231920 A1  Aug. 20, 2015

(30) Foreign Application Priority Data

Oct. 12, 2012  (JP) ................................ 2012-226941

(51) Int. Cl.
*F16C 33/64* (2006.01)
*B60B 27/00* (2006.01)
(Continued)

(52) U.S. Cl.
CPC ............ *B60B 27/0005* (2013.01); *B21D 53/10* (2013.01); *C21D 9/40* (2013.01); *F16C 33/64* (2013.01); *B60B 2310/211* (2013.01); *Y10T 29/49689* (2015.01)

(58) Field of Classification Search
CPC .. B60B 27/0005; F16C 33/64; F16C 2326/02
See application file for complete search history.

(56) References Cited

U.S. PATENT DOCUMENTS 4,893,960 A * 1/1990 Beier .................. B60B 27/0005
403/24
6,398,419 B1 * 6/2002 Kashiwagi .............. B23P 11/00
384/537

(Continued)

FOREIGN PATENT DOCUMENTS

| JP | 2000-211302 | 8/2000 |
| JP | 2010-42764 | 2/2010 |

(Continued)

OTHER PUBLICATIONS

International Preliminary Report on Patentability and Written Opinion of the International Searching Authority issued Apr. 14, 2015 in International (PCT) Application No. PCT/JP2013/074935.

(Continued)

*Primary Examiner* — Thomas R. Hannon
(74) *Attorney, Agent, or Firm* — Wenderoth, Lind & Ponack, L.L.P.

(57) ABSTRACT

A bearing device for a wheel includes an outer member having double-row outer raceway surfaces formed on an inner circumference thereof, an inner member including a hub wheel having a wheel mounting flange formed thereon and at least one inner race fitted to a small-diameter step portion formed on an outer circumference of the hub wheel, the inner member having double-row inner raceway surfaces formed thereon so as to be opposed to the double-row outer raceway surfaces, and a plurality of rolling elements in spaces between the double-row inner and outer raceway surfaces. The at least one inner race being fixed in an axial direction thereof by a staked portion, the staked portion having a face spline formed on an end surface thereof by plastic working.

16 Claims, 9 Drawing Sheets

(51) Int. Cl.
*C21D 9/40* (2006.01)
*B21D 53/10* (2006.01)

(56) References Cited

U.S. PATENT DOCUMENTS 6,857,190 B2 * 2/2005 Gavard .................. B23P 11/00
  29/894.36
7,857,520 B2 * 12/2010 Langer ................ B60B 27/0005
  384/544
8,210,752 B2 * 7/2012 Kamikawa ............ F16C 33/768
  384/544

2011/0077089 A1 3/2011 Hirai et al.
2012/0047740 A1 3/2012 Shirakami et al.
2012/0083344 A1 4/2012 Hirai et al.

FOREIGN PATENT DOCUMENTS

JP 2011-31682 2/2011
JP 2012-45612 3/2012

OTHER PUBLICATIONS

International Search Report issued Dec. 10, 2013 in International (PCT) Application No. PCT/JP2013/074935.

* cited by examiner

Fig. 7a
Fig. 7b
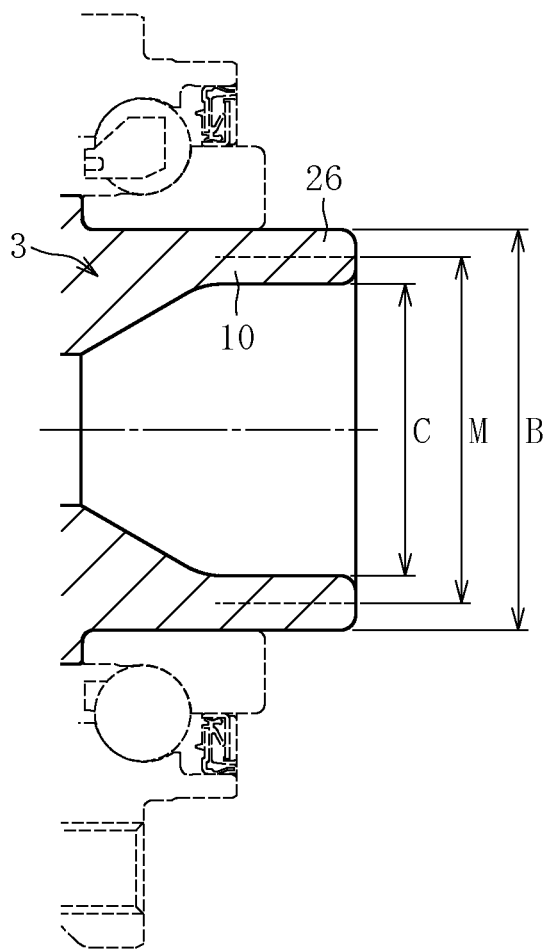
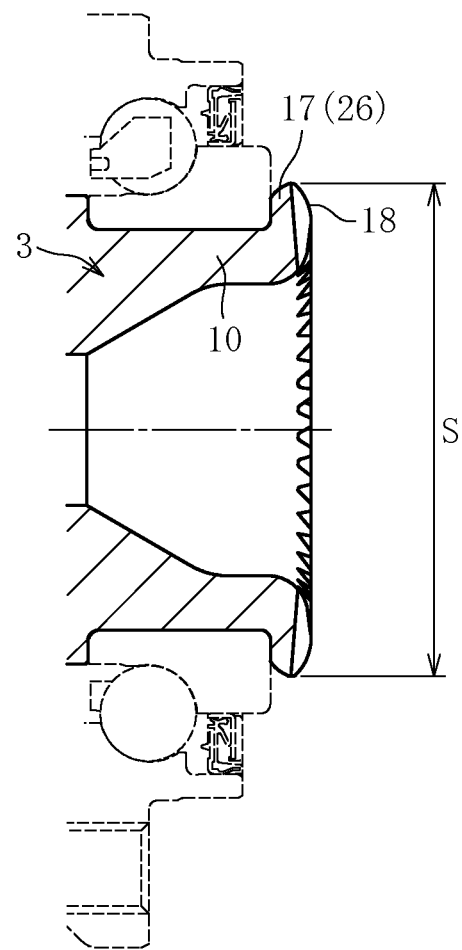

BEARING DEVICE FOR WHEEL AND MANUFACTURING METHOD THEREFOR

TECHNICAL FIELD

The present invention relates to a bearing device for a wheel, which rotatably supports a driving wheel of a vehicle such as an automobile, and to a manufacturing method for the bearing device for a wheel.

BACKGROUND ART

Power transmission devices for transmitting power of engines of automobiles or the like to wheels thereof are each required to allow angular displacement for taking turns of the vehicle, as well as angular displacement and axial displacement that may be caused by bounds of the vehicle during the drive. Therefore, general drive shafts of automobiles or the like are each constructed of a plunging type constant velocity universal joint capable of allowing the angular displacement and the axial displacement, which is mounted on a differential side (inboard side), a fixed type constant velocity universal joint capable of forming a high operating angle, which is mounted on a driving wheel side (outboard side), and a shaft for coupling the two types of constant velocity universal joints to each other. Further, the above-mentioned fixed type constant velocity universal joint is coupled to a bearing device for a wheel, which rotatably supports the driving wheel.

In recent years, there has been a strong demand for higher fuel efficiency of automobiles, thereby arousing a strong desire to attain a lighter-weight bearing device for a wheel as one of the components of automobiles. Hitherto, various proposals have been made to attain a lighter-weight bearing device for a wheel. In addition to the light-weighting, another important factor is to reduce the cost by simplifying assembling or disassembling work in the location of assembling automobiles or the market of maintenance for automobiles.

A bearing device for a wheel as illustrated in FIG. 9 is a typical example of the bearing device that meets the demand described above. A bearing device 51 for a wheel is constructed so as to be integrated with a constant velocity universal joint 81 as a unit in a removable manner. The bearing device 51 for a wheel mainly includes an outer member 52, a hub wheel 53, an inner race 54, balls 55 as rolling elements, and a retainer 56. The outer member 52 has double-row outer raceway surfaces 57 and 57 formed on an inner circumference thereof, and a vehicle body mounting flange 52a integrally formed on an outer circumference thereof so that the bearing device 51 for a wheel may be mounted to a knuckle (not shown) of a vehicle body. The hub wheel 53 has a wheel mounting flange 58 integrally formed at one end portion thereof so that the wheel (not shown) may be mounted to the bearing device 51 for a wheel, an inner raceway surface 59 formed on an outer circumference thereof so as to be opposed to one of the double-row outer raceway surfaces 57 and 57 of the outer member 52, and a cylindrical small-diameter step portion 60 formed so as to extend from the inner raceway surface 59 in an axial direction. The inner race 54 is press-fitted to the small-diameter step portion 60, and an inner raceway surface 59 is formed on an outer circumference of the inner race 54 so as to be opposed to another of the double-row outer raceway surfaces 57 and 57 of the outer member 52. Further, an inner member 61 is formed of the hub wheel 53 and the inner race 54. The plurality of balls 55 and 55 are assembled into spaces between the double-row outer raceway surfaces 57 and 57 of the outer member 52 and the double-row inner raceway surfaces 59 and 59 of the inner member 61 in a rollable manner. The balls 55 are received in the retainer 56 at predetermined intervals in a circumferential direction. The inner race 54 is fixed in the axial direction by a staked portion 62 formed by plastically deforming an end portion of the small-diameter step portion 60 of the hub wheel 53 radially outward. Further, a face spline 63 is formed on an end surface of the staked portion 62.

Seals 65 and 66 are fitted to opening portions of annular spaces formed between the outer member 52 and the inner member 61 of the bearing device 51 for a wheel, to thereby prevent leakage of lubricating grease filled inside the bearing to the outside and entry of rainwater, dust, and the like from the outside into the bearing.

On the other hand, the constant velocity universal joint 81 is a so-called Rzeppa constant velocity universal joint, which mainly includes an outer joint member 82, an inner joint member 83, a cage 84, and torque transmitting balls 85. The outer joint member 82 includes a cup section 86, and a bottom section 87 formed integrally with the cup section 86. A female thread 88 is formed on the bottom section 87. A face spline 90 is formed on a shoulder portion 89 of the bottom section 87. The face spline 90 meshes with the face spline 63 formed on the end surface of the staked portion 62 of the hub wheel 53, to thereby transmit rotational torque from a drive shaft (not shown) to the wheel mounting flange 58 via the constant velocity universal joint 81 and the hub wheel 53.

Both the opposing face splines 90 and 63 of the outer joint member 82 of the constant velocity universal joint 81 and the hub wheel 53 of the bearing device 51 for a wheel are meshed with each other, and a fastening bolt 64 is threadedly engaged with the female thread 88 of the bottom section 87 of the outer joint member 82. With the fastening bolt 64, the bearing device 51 for a wheel and the constant velocity universal joint 81 are fixed to each other by fastening. With the structure of such a removable unit, a lighter-weight and more compact device can be attained, and the assembling or disassembling work is simplified. In Patent Literature 1, there is disclosed a method of forming the face spline of the bearing device for a wheel as described above.

PRIOR ART DOCUMENTS

Patent Documents

Patent Document 1: JP 2011-31682 A

SUMMERY OF THE INVENTION

Problems to be Solved by the Invention

In the method of forming the face spline as disclosed in Patent Literature 1, the face spline is formed by pressing a staking punch. In order to avoid difficulty in the forming due to work hardening of the end portion of the hub wheel, the face spline is formed in two separate steps, that is, a step of forming a staked portion at the end portion of the hub wheel and a step of forming the face spline on an end surface of the staked portion. Therefore, there are problems of poor productivity and high manufacturing cost.

In order to form the staked portion and the face spline in one step and reduce processing load as well, the processing amount per rocking rotation may be reduced. In order to reduce the processing amount, reduction in axial movement speed of the die and increase in rocking rotation speed may be attempted. However, it has been found that those attempts cannot be fundamental solutions to the issues of, for example, attaining higher productivity and stable quality, or establishing a method of setting a product shape before the staking.

The present invention has been made in view of the problems and issues as described above, and it is therefore an object thereof to provide a bearing device for a wheel, including a face spline that is securely and easily settable in its product shape and formable at low cost with stable quality, and to provide a manufacturing method for the bearing device for a wheel.

Solution to the Problems

The inventors of the present invention have conducted various researches and experiments so as to attain the above-mentioned object, and as a result, found a novel idea of defining a relationship of complex factors including factors in dimensions such as the inner and outer diameters of a small-diameter step portion of a hub wheel and the outer diameter of a face spline after the forming, factors in materials, and factors depending on the type of process so as to realize a face spline that is securely and easily settable in its product shape and formable at low cost with stable quality. With this novel idea, the inventors of the present invention have arrived at the present invention.

As a technical measure to achieve the above-mentioned object, according to one embodiment of the present invention, there is provided a bearing device for a wheel, comprising: an outer member having double-row outer raceway surfaces formed on an inner circumference thereof; an inner member comprising: a hub wheel having a wheel mounting flange formed thereon; and at least one inner race fitted to a small-diameter step portion formed on an outer circumference of the hub wheel, the inner member having double-row inner raceway surfaces formed thereon so as to be opposed to the double-row outer raceway surfaces; and a plurality of rolling elements assembled into spaces between the double-row outer raceway surfaces and the double-row inner raceway surfaces, the at least one inner race being fixed in an axial direction thereof by a staked portion formed by plastically deforming an end portion of the small-diameter step portion of the hub wheel radially outward, the staked portion having a face spline formed on an end surface thereof by plastic working, wherein the following relationship is satisfied: $S/M \leq \alpha \times \beta$, where M represents a mean diameter of an outer diameter and an inner diameter of the end portion of the small-diameter step portion of the hub wheel before the staked portion is formed, S represents an outer diameter of the face spline, $\alpha$ represents a value indicating ductile elongation of a material for the hub wheel in terms of proportion, and $\beta$ represents a correction coefficient depending on a type of process.

Further, according to one embodiment of the present invention, there is provided a manufacturing method for a bearing device for a wheel, the bearing device comprising: an outer member having double-row outer raceway surfaces formed on an inner circumference thereof; an inner member comprising: a hub wheel having a wheel mounting flange formed thereon; and at least one inner race fitted to a small-diameter step portion formed on an outer circumference of the hub wheel, the inner member having double-row inner raceway surfaces formed thereon so as to be opposed to the double-row outer raceway surfaces; and a plurality of rolling elements assembled into spaces between the double-row outer raceway surfaces and the double-row inner raceway surfaces, the at least one inner race being fixed in an axial direction thereof by a staked portion formed by plastically deforming an end portion of the small-diameter step portion of the hub wheel radially outward, the staked portion having a face spline formed on an end surface thereof by plastic working, the manufacturing method comprising forming the staked portion and forming the face spline in one step on an intermediate product of the hub wheel while satisfying the following relationship: $S/M \leq \alpha \times \beta$, where M represents a mean diameter of an outer diameter and an inner diameter of the end portion of the small-diameter step portion before the forming of the staked portion, S represents an outer diameter of the face spline after the forming of the staked portion, $\alpha$ represents a value indicating ductile elongation of a material for the hub wheel in terms of proportion, and $\beta$ represents a correction coefficient depending on a type of process.

With the structure described above, the bearing device for a wheel, including the face spline that is securely and easily settable in its product shape and formable at low cost with stable quality, can be realized irrespective of the conditions of plastic working. Further, the face spline of the bearing device for a wheel can be formed at low cost with stable quality.

Specifically, when the face spline is formed by rotary-mode orbital forming, the correction coefficient $\beta$ depending on the type of process is set to 1.15. With this, the product shape of the hub wheel can be set securely and easily, and the face spline is attained with stable quality. In this case, the rotary-mode orbital forming refers to a forming method involving rocking motion in an orbiting direction about an axial center of a formed product (hub wheel) while keeping a constant inclination angle.

When the above-mentioned hub wheel is manufactured by using a preform obtained by hot forging of medium carbon steel having a carbon content of from 0.4 to 0.6 wt %, the value $\alpha$ indicating the ductile elongation in terms of proportion is set to 1.24. With this, the product shape of the hub wheel can be set securely and easily, and the face spline is attained with stable quality.

Further, from the viewpoint of increase in limit of ductility, the preform of the hub wheel is annealed, or is refined so as to have a crystal grain size of 7 or more. With this, the value $\alpha$ indicating the ductile elongation in terms of proportion can be set to more than 1.24 and 1.5 or less. In this case, the degree of design freedom of the product shape of the hub wheel capable of attaining the face spline having stable quality can be increased.

Effects of the Invention

According to the one embodiment of the present invention, the bearing device for a wheel, including the face spline that is securely and easily settable in its product shape and formable at low cost with stable quality, can be realized irrespective of the conditions of plastic working. Further, the face spline of the bearing device for a wheel can be formed at low cost with stable quality.

BRIEF DESCRIPTION OF DRAWINGS

FIG. 7a is a vertical sectional view illustrating a product shape of a hub wheel before staking.

FIG. 7b is a vertical sectional view illustrating a product shape of the hub wheel after forming the face spline.

EMBODIMENTS OF THE INVENTION

Now, embodiments of the present invention are described with reference to the drawings.

Figure 1:
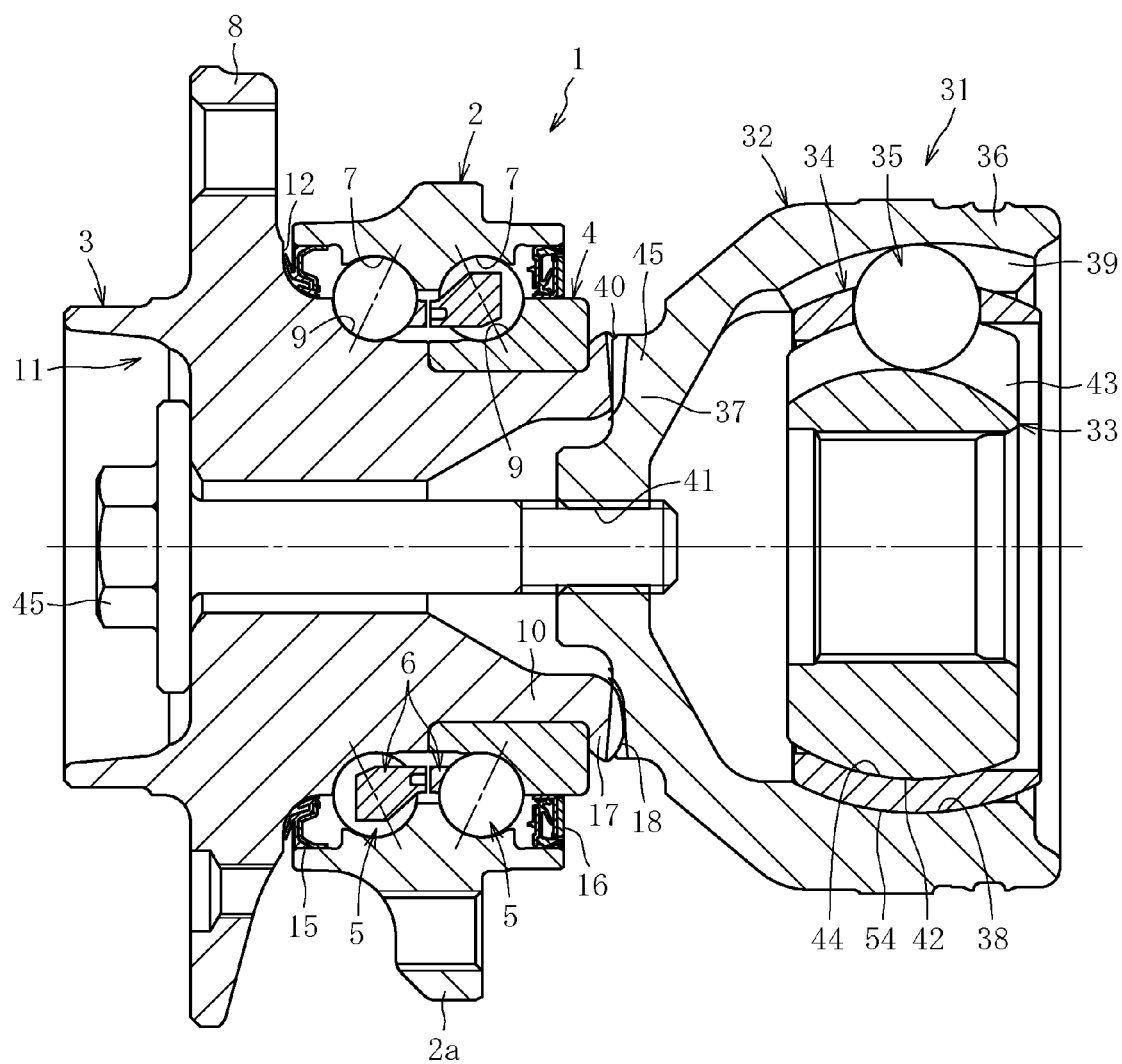
FIG. 1 is a vertical sectional view illustrating a bearing device for a wheel according to a first embodiment of the present invention.

A bearing device for a wheel according to a first embodiment of the present invention is described with reference to FIGS. 1 to 3. FIG. 1 is a vertical sectional view illustrating a state in which the bearing device for a wheel according to the first embodiment and a constant velocity universal joint are fastened to each other. A bearing device 1 for a wheel is constructed so as to be integrated with a constant velocity universal joint 31 as a unit in a removable manner. The bearing device 1 for a wheel mainly comprises an outer member 2, a hub wheel 3, an inner race 4, balls 5 as rolling elements, and a retainer 6, and has a so-called third generation structure. In the following description, the side close to an outer side of a vehicle under a state in which the bearing device 1 for a wheel is mounted to the vehicle is referred to as "outer side" (left side of FIG. 1), and the side close to a center of the vehicle is referred to as "inner side" (right side of FIG. 1).

The outer member 2 has double-row outer raceway surfaces 7 and 7 integrally formed on an inner circumference thereof, and a vehicle body mounting flange 2a integrally formed on an outer circumference thereof so that the bearing device 1 for a wheel may be mounted to a knuckle (not shown) of a vehicle body. An inner member 11 is formed of the hub wheel 3 and the inner race 4. The hub wheel 3 has an inner raceway surface 9 directly formed on an outer circumference thereof so as to be opposed to one of the double-row outer raceway surfaces 7 and 7 of the outer member 2 (on the outer side), and a wheel mounting flange 8 integrally formed at an end portion thereof on the outer side so that the wheel (not shown) may be mounted to the bearing device 1 for a wheel. A cylindrical small-diameter step portion 10 is formed on the outer circumference of the hub wheel 3 so as to extend from the inner raceway surface 9 toward the inner side in an axial direction, and the inner race 4 is press-fitted to the small-diameter step portion 10 with a predetermined interference. An inner raceway surface 9 is formed on an outer circumference of the inner race 4 so as to be opposed to another of the double-row outer raceway surfaces 7 and 7 of the outer member 2 (on the inner side). The plurality of balls 5 and 5 are assembled into spaces between the outer raceway surfaces 7 and 7 of the outer member 2 and the inner raceway surfaces 9 and 9 of the inner member 11. The balls 5 are received in the retainer 6 at predetermined intervals in a circumferential direction.

Seals 15 and 16 are fitted to opening portions of annular spaces formed between the outer member 2 and the inner member 11, to thereby prevent leakage of lubricating grease filled inside the bearing and entry of rainwater, dust, and the like from the outside into the bearing.

Under a state in which a predetermined bearing preload is applied, the inner race 4 press-fitted to the small-diameter step portion 10 of the hub wheel 3 is fixed to the hub wheel 3 in the axial direction by a staked portion 17 formed by plastically deforming an end portion of the small-diameter step portion 10 radially outward. A face spline 18 is formed on an end surface of the staked portion 17 by plastic working.

As illustrated in FIG. 1, the constant velocity universal joint 31 is a so-called Rzeppa constant velocity universal joint, which mainly comprises an outer joint member 32, an inner joint member 33, a cage 34, and torque transmitting balls 35. The outer joint member 32 comprises a cup section 36 and a bottom section 37, and the cup section 36 has a plurality of track grooves 39 formed in a spherical inner circumferential surface 38 thereof so as to extend along the axial direction. The inner joint member 33 has a plurality of track grooves 43 formed in a spherical outer circumferential surface 42 thereof so as to extend along the axial direction. The balls 35 are assembled into spaces between the track grooves 39 of the outer joint member 32 and the track grooves 43 of the inner joint member 33 that are opposed to the track grooves 39. The cage 34 has a spherical outer circumferential surface 54 and a spherical inner circumferential surface 44 fitted to the spherical inner circumferential surface 38 of the outer joint member 32 and the spherical outer circumferential surface 42 of the inner joint member 33, respectively, and is configured to receive the balls 35.

A face spline 40 is formed on a shoulder portion 45 of the bottom section 37 of the outer joint member 32 so as to mesh with the face spline 18 of the bearing device 1 for a wheel. A female thread 41 is formed at an axial center position of the joint. A fastening bolt 45 is inserted into an inner circumferential hole of the hub wheel 3 of the bearing device 1 for a wheel and threadedly engaged with the female thread 41. With the fastening bolt 45, the bearing device 1 for a wheel and the constant velocity universal joint 31 are fixed to each other by fastening under a state in which both the face splines 18 and 40 are meshed with each other. Thus, the bearing device 1 for a wheel and the constant velocity universal joint 31 are integrated with each other as a removable unit.

The outer joint member 32 is made of medium carbon steel containing 0.40 to 0.60 wt % of carbon, such as S53C. Although illustration is omitted, a predetermined hardened layer having a surface hardness of about 58 to 62 HRC is formed by induction hardening on each of the track grooves 39, the spherical inner circumferential surface 38, and the like. Further, the inner joint member 33 and the cage 34 are each made of carburizing steel such as SCM or SCr materials. The track grooves 43 and the spherical outer circumferential surface 42 of the inner joint member 33 and the surfaces of the cage 34 are hardened by carburizing and quenching so as to have a hardness of about 58 to 62 HRC.

Figure 2:
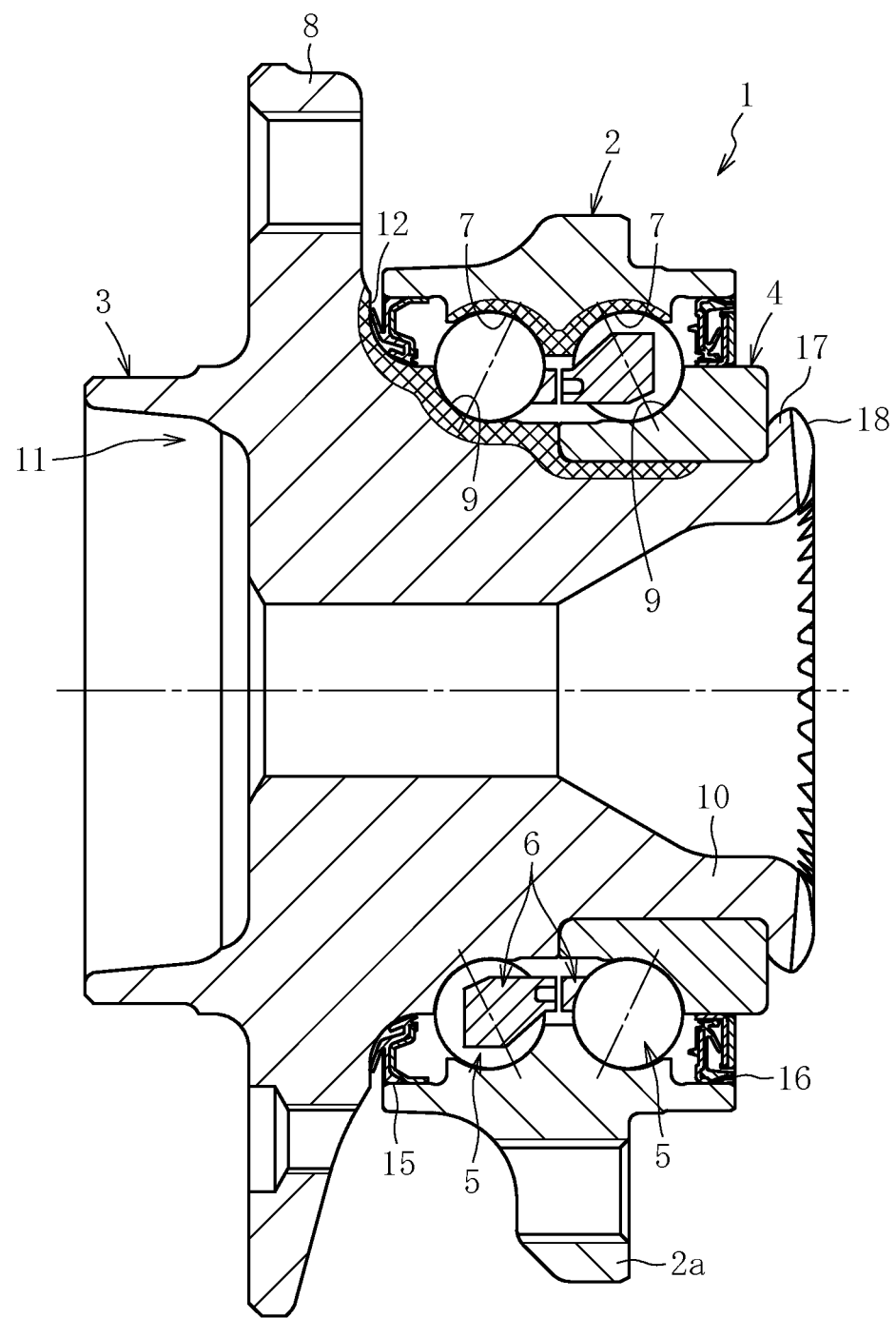
FIG. 2 is an enlarged vertical sectional view illustrating the bearing device for a wheel.

FIG. 2 illustrates an enlarged vertical cross section of the bearing device 1 for a wheel. The outer member 2 and the hub wheel 3 are each made of medium carbon steel containing 0.40 to 0.60 wt % of carbon, such as S53C. A predetermined hardened layer having a surface hardness of about 58 to 62 HRC (indicated by cross hatching) is formed by induction hardening on each of the double-row outer raceway surfaces 7 and 7 of the outer member 2. In the hub wheel 3, a hardened layer having a surface hardness of about 58 to 62 HRC (indicated by cross hatching) is formed by induction hardening on an outer circumferential surface ranging from a base portion 12 of the wheel mounting flange 8, which serves as a seal land portion of the seal 15 on the outer side, to the small-diameter step portion 10. Thus, the hub wheel 3 has high abrasion resistance at the seal land portion and sufficient mechanical strength and durability against a rotary bending load to be applied to the wheel mounting flange 8. The staked portion 17 has no hardened layer formed thereon, but has a hardness of about 15 to 25 HRC due to work hardening at the time of forming the staked portion 17.

The inner race 4 and the balls 5 are each made of high-carbon chromium bearing steel such as SUJ2 and hardened by through-hardening in a region up to the core so as to have a hardness of about 58 to 62 HRC.

Figure 3:
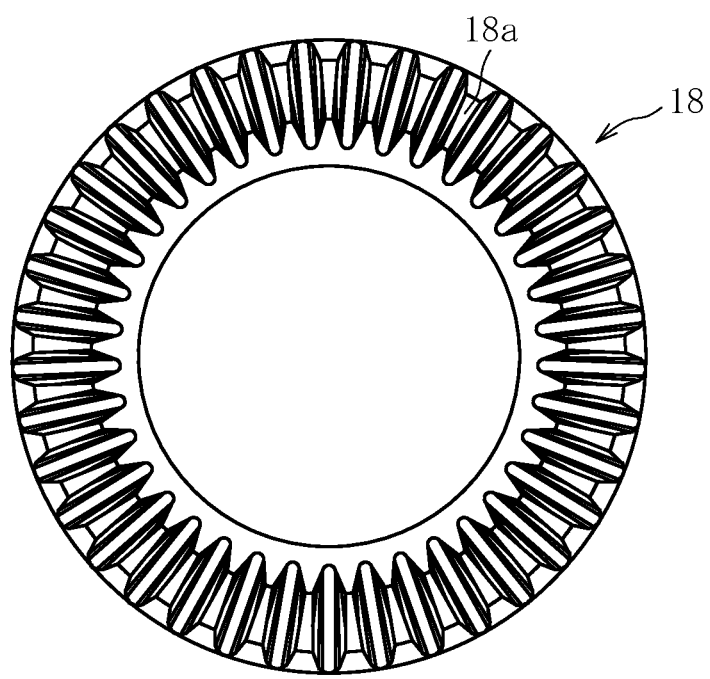
FIG. 3 is a view illustrating a face spline formed on the bearing device for a wheel.

FIG. 3 illustrates details of the face spline 18 formed on the bearing device 1 for a wheel. The face spline 40 formed on the constant velocity universal joint 31 is basically the same as the face spline 18, and description thereof is therefore omitted herein. The face spline 18 has a large number of teeth 18a formed in a radiate pattern, and the cross section of each of the teeth 18a is increased in area as approaching the radially outer side. In the face spline 18 of the bearing device 1 for a wheel to be used for cars including a four-wheel drive vehicle, a spline outer diameter S thereof (see FIG. 7b), a module of each of the teeth 18a, and a pressure angle thereof fall within ranges of about ϕ 45 to 70 mm, about 1 to 3 mm, and about 20° to 30°, respectively. Specific features of the face spline of the bearing device 1 for a wheel according to this embodiment are described in detail through the following description of a manufacturing method according to an embodiment of the present invention.

Figure 4:
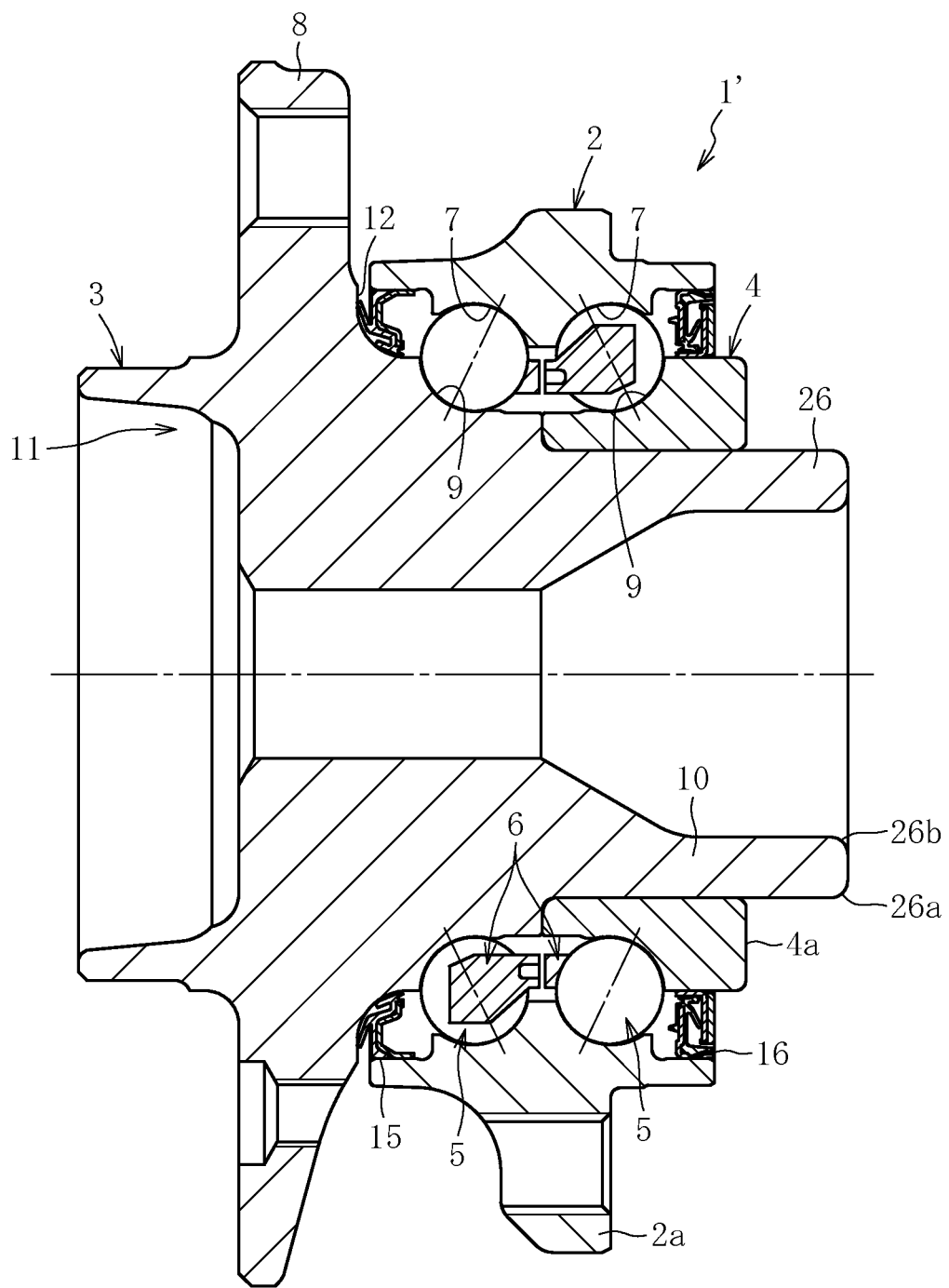
FIG. 4 is a vertical sectional view illustrating an intermediate product of the bearing device for a wheel.
Figure 5:
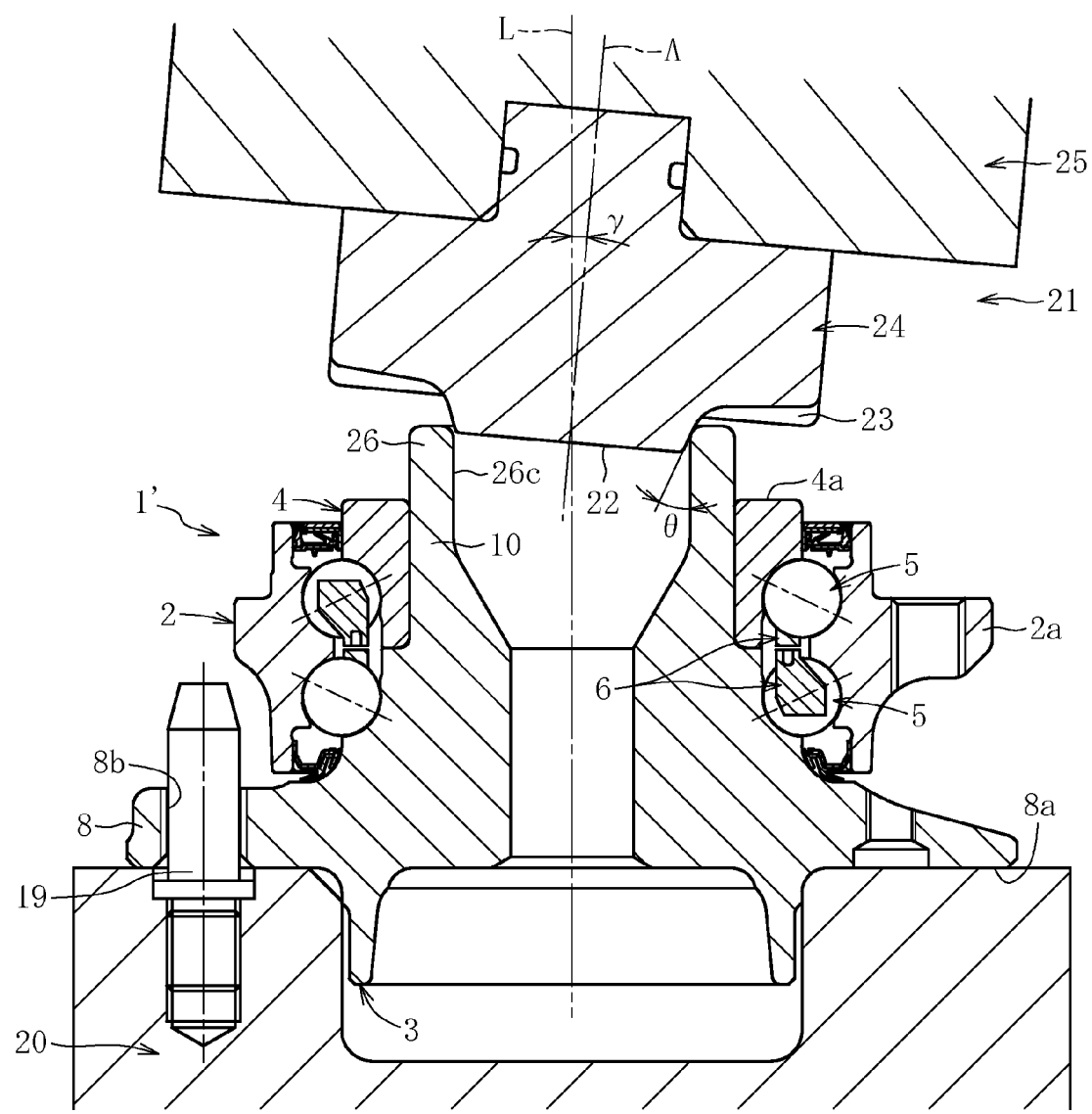
FIG. 5 is a vertical sectional view illustrating a manufacturing method for the bearing device for a wheel according to an embodiment of the present invention.
Figure 6:
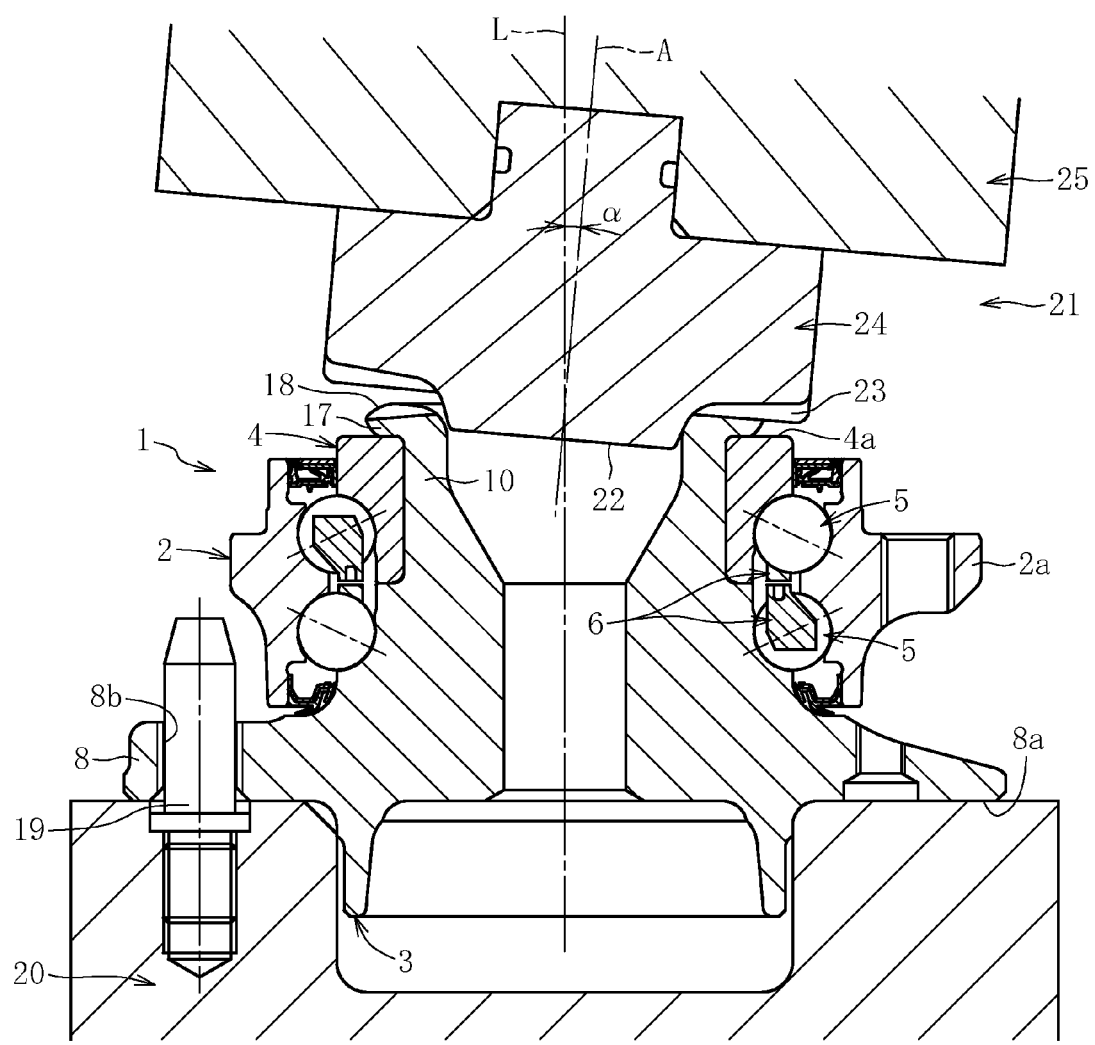
FIG. 6 is a vertical sectional view illustrating the manufacturing method for the bearing device for a wheel according to the embodiment of the present invention.

Next, the manufacturing method for the bearing device for a wheel according to the embodiment of the present invention is described with reference to FIGS. 4 to 6. FIG. 4 is a vertical sectional view illustrating a state before the end portion of the small-diameter step portion 10 of the hub wheel 3 is staked. The outer member 2, the balls 5, the retainer 6, the inner race 4, and the seals 15 and 16 are assembled onto the outer side of the hub wheel 3. An inner-side end portion 26 of the small-diameter step portion 10 is formed into a cylindrical shape, and chamfered portions 26a and 26b each having an arc shape are formed at the end portion. The inner-side end portion 26 of the small-diameter step portion 10 has no hardened layer formed thereon, and has a hardness of about 13 to 20 HRC.

An intermediate product 1' of the bearing device for a wheel in the state of FIG. 4 is processed with a rotary-mode orbital forming machine so as to form the staked portion 17 and the face spline 18 at the inner-side end portion 26 of the small-diameter step portion 10 of the hub wheel 3. The orbital forming of the staked portion 17 and the face spline 18 is described with reference to FIGS. 5 and 6. As illustrated in FIG. 5, the hub wheel 3 is placed in a vertical posture on a base 20 having a plurality of knock pins 19 arranged thereon under a state in which a side surface 8a of the wheel mounting flange 8 on the outer side is brought into abutment against the base 20, and is supported and fixed by inserting the knock pins 19 through insertion holes 8b for hub bolts to be press-fitted to the wheel mounting flange 8.

A staking tool 21 of the orbital forming machine comprises a punch 24 having a projecting portion 22 formed at a center portion on one end surface of the staking tool 21 and tooth profiles 23 formed in a range of from a circumferential edge of the projecting portion 22 to an outer circumferential portion of the punch 24 so as to perform plastic working for forming the face spline 18, and a rocking shaft 25 having a center axis A inclined at a predetermined inclination angle γ with respect to an axial center L of the hub wheel 3. The rocking shaft 25 performs rocking motion in an orbiting direction about the axial center L of the hub wheel 3 while keeping the constant inclination angle γ. A rotation stopper (not shown) is arranged so that the phase is not shifted with respect to the hub wheel 3 at the time of forming the face spline 18. Further, the punch 24 is fixed to the rocking shaft 25 in a non-rotatable manner so that the phase is not shifted with respect to the hub wheel 3. The inclination angle γ is set within a range of from 4° to 6°.

The projecting portion 22 of the punch 24 is formed so as to abut against the inner-side end portion 26 at a predetermined inclination angle θ with respect to a cylindrical radially inner part 26c of the inner-side end portion 26 of the small-diameter step portion 10. The inclination angle θ is set within a range of from 15° to 35°.

In the structure described above, the base 20 having the hub wheel 3 supported and fixed thereon is raised so that the staking tool 21 is caused to enter the cylindrical radially inner part 26c of the inner-side end portion 26 of the hub wheel 3. The punch 24 is pressed against the inner-side end portion 26 with a predetermined processing force, and is caused to perform rocking motion in the orbiting direction about the axial center L of the hub wheel 3 at the constant inclination angle γ. Through the rocking motion, the inner-side end portion 26 is plastically deformed radially outward as illustrated in FIG. 6, to thereby form the staked portion 17 and also form the face spline 18 on the end surface of the staked portion 17 at the same time. Further, the lower side surface of the staked portion 17 abuts against an end surface 4a of the inner race 4 so that the inner race 4 is fixed to the hub wheel 3 in the axial direction under the state in which a predetermined bearing preload is applied. As described above, the rotary-mode orbital forming refers to a forming method involving the rocking motion in the orbiting direction about the axial center L of the hub wheel 3 while keeping the constant inclination angle γ.

Now, detailed description is given of the face spline 18 formable at low cost with stable quality, which is the characteristic structure of the present invention. In the present invention, the research was conducted focusing on the fact that the face spline 18 had a limit on its ductility in view of the forming method that was plastic working.

Details are described with reference to FIG. 7. FIG. 7a is a vertical sectional view illustrating the inner-side end portion 26 of the small-diameter step portion 10 of the hub wheel 3 before staking. FIG. 7b is a vertical sectional view illustrating the inner-side end portion 26 of the small-diameter step portion 10 of the hub wheel 3 after forming the face spline. In FIG. 7, the outer member, the inner race, the balls, the retainer, and the seal of the bearing device for a wheel, which are assembled onto the hub wheel 3, are indicated by the broken lines for the sake of securing clear view of the state of the inner-side end portion 26.

In general, in order to attain stable manufacture in the case of forming to be performed by utilizing plastic deformation, it is necessary to set a processing degree equal to or less than the limit of ductility of a workpiece in consideration of work hardening. Note that, the limit of ductility of a material is generally obtained by a uniaxial tensile test, but the limit of ductility is increased in the case of orbital forming, and hence a correction coefficient needs to be taken into consideration. Further, heat treatment for increasing the limit of ductility may be performed as a matter of course.

As a result of experiments conducted under various conditions in consideration of the above-mentioned factors, it was found that a face spline having stable quality was able to be formed by setting a product shape satisfying a relationship of S/M≤α×β between a mean diameter M of an outer diameter B and an inner diameter C of the inboard-side end portion 26 of the small-diameter step portion 10 of the hub wheel 3 before the staking as illustrated in FIG. 7a [M=(B+C)/2], an outer diameter S of the face spline as illustrated in FIG. 7b, a value α indicating ductile elongation of a material for the hub wheel 3 in terms of proportion, and a correction coefficient β depending on the type of process. In this case, the ratio S/M of the outer diameter S of the face spline to the mean diameter M of the inboard-side end portion 26 is referred to as "diameter increase ratio". Further, the product α×β of the value α indicating the ductile elongation of the material in terms of proportion and the correction coefficient β depending on the forming method is referred to as "actual limit of ductility".

For example, a preform of the hub wheel of this embodiment, which is obtained by hot forging of medium carbon steel containing 0.4 to 0.6 wt % of carbon, has a ductile elongation of 24%, and this ductile elongation is expressed as "1.24" in terms of proportion. The value "1.24" corresponds to the value α indicating the ductile elongation in terms of proportion, which is the limit of ductility in the ductile elongation of the material for the hub wheel 3. Further, the limit of ductility for the diameter increase ratio S/M obtained when the face spline was actually formed by rotary-mode orbital forming was determined as "1.43" based on the results of the experiments. From those factors, in the case of rotary-mode orbital forming, the correction coefficient β depending on the type of process was determined as "β=1.43/1.24≈1.15".

As described above, the actual limit α×β of ductility is 1.43 in the case of rotary-mode orbital forming using the intermediate product 1' manufactured from the preform of the hub wheel, which is obtained by hot forging of medium carbon steel containing 0.4 to 0.6 wt % of carbon. Thus, it was found that the face spline 18 was able to be formed without any trouble when the actual limit α×β of ductility was 1.43 or less as the product shape having the diameter increase ratio S/M. In this case, the staking of the inboard-side end portion 26 and the forming of the face spline 18 can be performed in one step.

As described above, when the actual limit α×β of ductility is 1.43 or less as the product shape having the diameter increase ratio S/M, the face spline 18 having stable quality can be formed without any trouble in the forming irrespective of the processing conditions. Thus, the product shape of the inboard-side end portion 26 of the small-diameter step portion of the hub wheel can be set securely and easily.

Further, as a result of experiments conducted from the viewpoint of increase in limit of ductility, it was confirmed that the value α indicating the ductile elongation in terms of proportion was able to be set to more than 1.24 and 1.5 or less when the preform of the hub wheel was annealed, or was refined so as to have a crystal grain size of 7 or more. In this case, the degree of design freedom of the product shape of the hub wheel capable of attaining the face spline having stable quality can be increased.

In the face spline of the bearing device for a wheel to be used for cars including a four-wheel drive vehicle, the spline outer diameter S thereof, the module of each of the teeth, and the pressure angle thereof are settled into the ranges of about φ 45 to 70 mm, about 1 to 3 mm, and about 20° to 30°, respectively. Thus, the reference that the diameter increase ratio S/M is set to 1.43 or less as the product shape can widely be applied to various types of vehicle.

In this embodiment, the limit of ductility for the diameter increase ratio S/M obtained when the face spline was formed by rotary-mode orbital forming was determined based on the results of the experiments. However, the present invention is not limited thereto. The limit of ductility for the diameter increase ratio S/M may be determined by similar experiments even when the face spline is formed by other plastic working. In this case, the correction coefficient β depending on the type of process may be determined as well. Thus, even in the case of other plastic working, the product shape of the inboard-side end portion 26 of the small-diameter step portion of the hub wheel can be set securely and easily.

Figure 8:
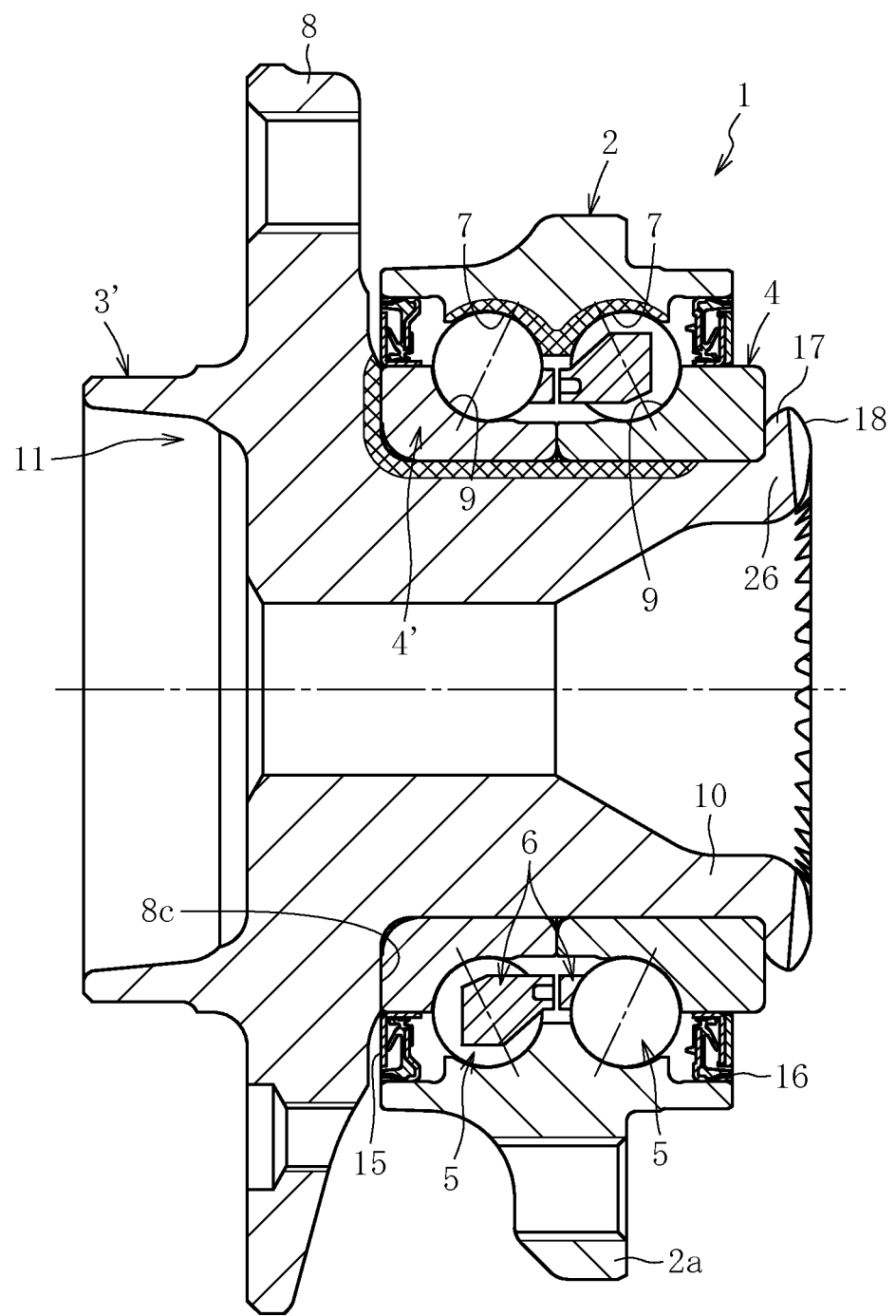
FIG. 8 is a vertical sectional view illustrating a bearing device for a wheel according to a second embodiment of the present invention.
Figure 9:
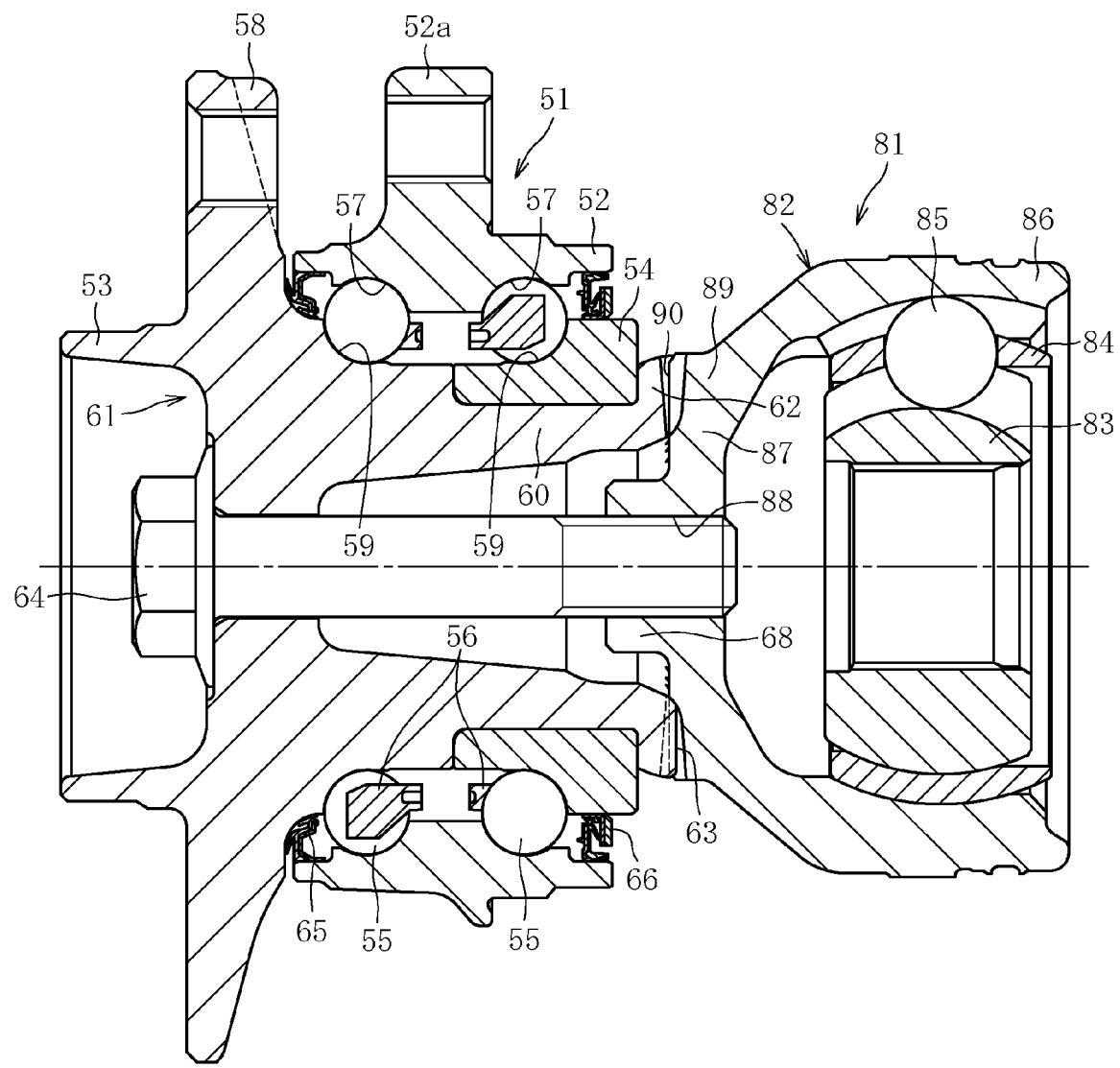
FIG. 9 is a vertical sectional view illustrating a related-art bearing device for a wheel.

Next, a bearing device for a wheel according to a second embodiment of the present invention is described with reference to FIG. 8. FIG. 8 is a vertical sectional view illustrating the bearing device for a wheel according to this embodiment. This embodiment only differs from the above-mentioned first embodiment basically in the structure of the inner member, and hence the parts having the same function are represented by the same reference symbols.

A bearing device 1 for a wheel mainly comprises an outer member 2, a hub wheel 3', a pair of inner races 4 and 4', balls 5, and a retainer 6, and has a so-called second generation structure. The outer member 2 has double-row outer raceway surfaces 7 and 7 integrally formed on an inner circumference thereof, and a vehicle body mounting flange 2a integrally formed on an outer circumference thereof so that the bearing device 1 for a wheel may be mounted to a knuckle (not shown) of a vehicle body. An inner member 11 is formed of the hub wheel 3' and the pair of inner races 4 and 4'. The inner races 4 and 4' have inner raceway surfaces 9 and 9 formed on outer circumferences thereof so as to be opposed to the double-row outer raceway surfaces 7 and 7 of the outer member 2. The hub wheel 3' has a wheel mounting flange 8 integrally formed at an end portion thereof on the outer side so that the wheel (not shown) may be mounted to the bearing device 1 for a wheel. A cylindrical small-diameter step portion 10 is formed so as to extend from the wheel mounting flange 8 in the axial direction through a shoulder portion 8c. The pair of inner races 4 and 4' is press-fitted to the small-diameter step portion 10 of the hub wheel 3' with a predetermined interference until the inner race 4' abuts against the shoulder portion 8c. Under a state in which a predetermined axial preload is applied, the pair of inner races 4 and 4' is fixed in the axial direction by a staked portion 17 formed by plastically deforming an inner-side end portion 26 of the small-diameter step portion 10 radially outward. A face spline 18 is formed on an end surface of the staked portion 17 by plastic working. The plurality of balls 5 and 5 are assembled into spaces between the outer raceway surfaces 7 and 7 of the outer member 2 and the inner raceway surfaces 9 and 9 of the inner member 11. The balls 5 are received in the retainer 6 at predetermined intervals in a circumferential direction.

Seals 15 and 16 are fitted to opening portions of annular spaces formed between the outer member 2 and the inner member 11, to thereby prevent leakage of lubricating grease filled inside the bearing and entry of rainwater, dust, and the like from the outside into the bearing.

Although illustration is omitted, the bearing device 1 for a wheel according to this embodiment is also constructed so as to be integrated with a constant velocity universal joint as a unit in a removable manner. Similarly to the first embodiment, a face spline is formed on a shoulder portion of a bottom section of an outer joint member so as to mesh with the face spline 18 of the bearing device 1 for a wheel. A fastening bolt is inserted into an inner circumferential hole of the hub wheel 3' of the bearing device 1 for a wheel. With the fastening bolt, the bearing device 1 for a wheel and the constant velocity universal joint are fixed to each other by fastening under a state in which both the face splines are meshed with each other.

The outer joint member 2 and the hub wheel 3' are each made of medium carbon steel containing 0.40 to 0.60 wt % of carbon, such as S53C. A predetermined hardened layer having a surface hardness of about 58 to 62 HRC (indicated by cross hatching) is formed by induction hardening on each of the double-row outer raceway surfaces 7 and 7 of the outer member 2. In the hub wheel 3', a hardened layer having a surface hardness of about 58 to 62 HRC (indicated by cross hatching) is formed by induction hardening on an outer circumferential surface ranging from the shoulder portion 8c of the wheel mounting flange 8 on the outer side to the small-diameter step portion 10. Thus, the hub wheel 3' has sufficient mechanical strength and durability against a rotary bending load to be applied to the wheel mounting flange 8. The staked portion 17 has no hardened layer formed thereon, but has a hardness of about 15 to 25 HRC due to work hardening at the time of forming the staked portion 17.

The inner races 4 and 4' and the balls 5 are each made of high-carbon chromium bearing steel such as SUJ2 and hardened by through-hardening in a region up to the core so as to have a hardness of about 58 to 62 HRC.

Also in this embodiment, similarly to the first embodiment, the product shape is set so as to satisfy a relationship of $S/M \leq \alpha \times \beta$ between a mean diameter M of the inboard-side end portion 26 of the small-diameter step portion 10 of the hub wheel 3' before staking, an outer diameter S of the face spline 18, a value α indicating ductile elongation of a material for the hub wheel 3' in terms of proportion, and a correction coefficient β depending on the type of process. Therefore, a face spline having stable quality is formed. The specifications of the face spline 18, the orbital forming, and the like are similar to those of the first embodiment and the embodiment for the manufacturing method, and redundant description is therefore omitted herein.

EXAMPLES

Examples of the present invention are described below. In each of the examples, the hub wheel of the bearing device 1 for a wheel according to the first embodiment was manufactured using a hot-forged preform of the hub wheel, which was made of S53C being medium carbon steel having a carbon content of 0.53 wt %. In order to investigate the limit of ductility of the hub wheel, a tensile test was conducted based on a tensile test method for metallic materials as defined in JIS Z2241. A breaking elongation of 24.0% was obtained as an average of measurement results under a condition that the number of samples was n=3. This value is converted into "α=1.24" in terms of proportion. Further, three different parameters were set as the specifications of the face spline in the examples of the present invention.

Example 1

As the specifications of the face spline, the number of teeth, the pressure angle, and the curvature radius of the root were set to 31, 27.5°, and 0.8 mm, respectively. As a shape of the portion to be formed before the forming, the outer diameter B and the inner diameter C of the inboard-side end portion 26 of the small-diameter step portion of the hub wheel were set to ϕ 42 mm and ϕ 29.6 mm, respectively, that is, the mean diameter M was set to ϕ 35.8 mm. The face spline was formed within a standard range of ϕ 50 to 55 mm as the range of the outer diameter S of the face spline after the forming, and then the portion to be formed was observed to measure the length of a generated crack. Table 1 shows results of the respective samples having different diameter increase ratios S/M according to Example 1.

TABLE 1

| Sample | Mean diameter M of end portion (mm) | Spline outer diameter S (mm) | Diameter increase ratio S/M | Crack length (mm) |
| --- | --- | --- | --- | --- |
| A-1 | 35.8 | 49.86 | 1.39 | 0 |
| A-2 | 35.8 | 50.17 | 1.40 | 0 |
| A-3 | 35.8 | 50.51 | 1.41 | 0 |
| A-4 | 35.8 | 50.83 | 1.42 | 0 |
| A-5 | 35.8 | 51.13 | 1.43 | 0 |
| A-6 | 35.8 | 51.44 | 1.44 | 0.4 |
| A-7 | 35.8 | 51.78 | 1.45 | 0.4 |
| A-8 | 35.8 | 52.09 | 1.46 | 0.7 |
| A-9 | 35.8 | 52.45 | 1.46 | 0.9 |
| A-10 | 35.8 | 52.79 | 1.47 | 1.1 |
| A-11 | 35.8 | 53.20 | 1.49 | 1.3 |
| A-12 | 35.8 | 53.52 | 1.49 | 1.3 |
| A-13 | 35.8 | 53.94 | 1.51 | 1.5 |
| A-14 | 35.8 | 54.45 | 1.52 | 2.3 |
| A-15 | 35.8 | 54.99 | 1.54 | 2.4 |

As understood from Table 1, no crack was formed in Samples A-1 to A-5. The diameter increase ratio S/M of Sample A-5 was 1.43. Thus, it was found that the face spline was able to be formed without any trouble when the diameter increase ratio S/M was 1.43 or less as the product shape.

Example 2

As the specifications of the face spline, the number of teeth, the pressure angle, and the curvature radius of the root were set to 31, 27.5°, and 0.8 mm, respectively, as in Example 1. As a shape of the portion to be formed before the forming, the outer diameter B and the inner diameter C of the inboard-side end portion 26 of the small-diameter step portion of the hub wheel were set to ϕ 46 mm and ϕ 33.6 mm, respectively, that is, the mean diameter M was set to ϕ 39.8 mm. The face spline was formed within a standard range of ϕ 50 to 58 mm as the range of the outer diameter S of the face spline after the forming, and then the portion to be formed was observed to measure the length of a generated crack. Table 2 shows results of the respective samples having different diameter increase ratios S/M according to Example 2.

TABLE 2

| Sample | Mean diameter M of end portion (mm) | Spline outer diameter S (mm) | Diameter increase ratio S/M | Crack length (mm) |
| --- | --- | --- | --- | --- |
| B-1 | 39.8 | 50.00 | 1.26 | 0 |
| B-2 | 39.8 | 51.00 | 1.28 | 0 |
| B-3 | 39.8 | 52.00 | 1.31 | 0 |
| B-4 | 39.8 | 53.00 | 1.33 | 0 |
| B-5 | 39.8 | 54.00 | 1.36 | 0 |
| B-6 | 39.8 | 55.00 | 1.38 | 0 |
| B-7 | 39.8 | 57.00 | 1.43 | 0 |
| B-8 | 39.8 | 58.00 | 1.46 | 0.1 |
| B-9 | 39.8 | 58.50 | 1.47 | 0.4 |
| B-10 | 39.8 | 59.00 | 1.48 | 0.6 |

As understood from Table 2, no crack was formed in Samples B-1 to B-7. The diameter increase ratio S/M of Sample B-7 was 1.43. Thus, as in Example 1, it was found that the face spline was able to be formed without any trouble when the diameter increase ratio S/M was 1.43 or less as the product shape.

Example 3

As the specifications of the face spline, the number of teeth, the pressure angle, and the curvature radius of the root were set to 37, 27.5°, and 0.8 mm, respectively. As a shape of the portion to be formed before the forming, the outer diameter B and the inner diameter C of the inboard-side end portion 26 of the small-diameter step portion of the hub wheel were set to φ 53 mm and φ 38.6 mm, respectively, that is, the mean diameter M was set to φ 45.8 mm. The face spline was formed within a standard range of φ 59 to 67 mm as the range of the outer diameter S of the face spline after the forming, and then the portion to be formed was observed to measure the length of a generated crack. Table 3 shows results of the respective samples having different diameter increase ratios S/M according to Example 3.

TABLE 3

| Sample | Mean diameter M of end portion (mm) | Spline outer diameter S (mm) | Diameter increase ratio S/M | Crack length (mm) |
|---|---|---|---|---|
| C-1 | 45.8 | 59.00 | 1.29 | 0 |
| C-2 | 45.8 | 60.00 | 1.31 | 0 |
| C-3 | 45.8 | 61.00 | 1.33 | 0 |
| C-4 | 45.8 | 62.00 | 1.35 | 0 |
| C-5 | 45.8 | 63.00 | 1.38 | 0 |
| C-6 | 45.8 | 63.50 | 1.39 | 0 |
| C-7 | 45.8 | 64.00 | 1.40 | 0 |
| C-8 | 45.8 | 65.50 | 1.43 | 0 |
| C-9 | 45.8 | 66.00 | 1.44 | 0.1 |
| C-10 | 45.8 | 66.50 | 1.45 | 0.3 |
| C-11 | 45.8 | 67.00 | 1.46 | 0.9 |

As understood from Table 3, no crack was formed in Samples C-1 to C-8. The diameter increase ratio S/M of Sample C-8 was 1.43. Thus, as in Examples 1 and 2, it was found that the face spline was able to be formed without any trouble when the diameter increase ratio S/M was 1.43 or less as the product shape.

In the face spline of the bearing device for a wheel to be used for cars including a four-wheel drive vehicle, the spline outer diameter S thereof, the module of each of the teeth, and the pressure angle thereof are settled into the ranges of about φ 45 to 70 mm, about 1 to 3 mm, and about 20° to 30°, respectively. Thus, based on the results of Examples 1 to 3, it was found that the reference that the diameter increase ratio S/M was set to 1.43 or less as the product shape formable without any trouble was able to be widely applied to various types of vehicle.

Further, the results of the experiments conducted in Examples 1 to 3 show the limit of ductility for the diameter increase ratio S/M obtained when the face spline was formed by rotary-mode orbital forming. Alternatively, the limit of ductility for the diameter increase ratio S/M may be determined by similar experiments even when the face spline is formed by other plastic working. In this case, the correction coefficient β depending on the type of process may be determined as well. Thus, even in the case of other plastic working, the product shape of the inboard-side end portion 26 of the small-diameter step portion of the hub wheel can be set securely and easily.

The double-row angular contact ball bearing using the balls as the rolling elements is exemplified as the bearing device for a wheel according to each of the embodiments of the present invention. However, the present invention is not limited thereto. The bearing device for a wheel may be a double-row tapered roller bearing using tapered rollers as the rolling elements.

Needless to say, the bearing device for a wheel according to each of the embodiments of the present invention is applicable not only to a vehicle such as an automobile including a power transmission device for transmitting power of an engine to a wheel, but also to a vehicle such as an automobile including a power transmission device for transmitting power of a motor or both power of a motor and power of an engine to a wheel, that is, an electric vehicle, a hybrid vehicle, or the like.

The bearing device for a wheel according to each of the embodiments of the present invention is the third generation bearing mainly comprising the outer member, the hub wheel, the single-row inner race, the balls, and the retainer, and the second generation bearing mainly comprising the outer member, the hub wheel, the pair of inner races, the balls, and the retainer. However, the present invention is not limited thereto. The bearing device for a wheel may be a first generation bearing without the vehicle body mounting flange.

The fixed type Rzeppa constant velocity universal joint is exemplified as the constant velocity universal joint to be integrated with the bearing device for a wheel according to each of the embodiments of the present invention as a unit in a removable manner. However, the present invention is not limited thereto. A fixed type undercut-free constant velocity universal joint, a plunging type double offset constant velocity universal joint, a cross groove constant velocity universal joint, a tripod type constant velocity universal joint, or the like may be employed as appropriate.

The present invention is not limited to the above-mentioned embodiments. As a matter of course, the present invention may be carried out in various other modes without departing from the gist of the present invention. The scope of the present invention is defined in the claims, and encompasses equivalents described in the claims and all changes within the scope of claims.

DESCRIPTION OF REFERENCE SIGNS

1 bearing device for wheel
2 outer member
2a vehicle body mounting flange
3 hub wheel
4 inner race
5 ball
6 retainer
7 outer raceway surface
8 wheel mounting flange
9 inner raceway surface
10 small-diameter step portion
11 inner member
17 staked portion
18 face spline
26 inner-side end portion
31 constant velocity universal joint
32 outer joint member
33 inner joint member
34 cage
35 torque transmitting ball
40 face spline
A rocking shaft
B outer diameter of inboard-side end portion
C inner diameter of inboard-side end portion
L axial center of hub wheel
M mean diameter of inboard-side end portion
S outer diameter of face spline
α value indicating ductile elongation of material in terms of proportion
β correction coefficient depending on type of process

The invention claimed is:

1. A bearing device for a wheel, comprising:
an outer member having double-row outer raceway surfaces formed on an inner circumference thereof;
an inner member comprising:
  a hub wheel having a wheel mounting flange formed thereon; and
  at least one inner race fitted to a small-diameter step portion formed on an outer circumference of the hub wheel,
  the inner member having double-row inner raceway surfaces formed thereon so as to be opposed to the double-row outer raceway surfaces; and
a plurality of rolling elements assembled into spaces between the double-row outer raceway surfaces and the double-row inner raceway surfaces,
the at least one inner race being fixed in an axial direction thereof by a staked portion formed by plastically deforming an end portion of the small-diameter step portion of the hub wheel radially outward,
the staked portion having a face spline formed on an end surface thereof by plastic working,
wherein the following relationship is satisfied:

$$S/M \leq \alpha \times \beta$$

where M represents a mean diameter of an outer diameter and an inner diameter of the end portion of the small-diameter step portion of the hub wheel before the staked portion is formed, S represents an outer diameter of the face spline, $\alpha$ represents a value indicating ductile elongation of a material for the hub wheel in terms of proportion, and $\beta$ represents a correction coefficient depending on a type of process.

2. The bearing device for a wheel according to claim 1, wherein the face spline is formed by orbital forming, and wherein the correction coefficient $\beta$ depending on a forming method is set to 1.15.

3. The bearing device for a wheel according to claim 2, wherein the hub wheel is formed by using a preform obtained by hot forging of medium carbon steel having a carbon content of from 0.4 to 0.6 mass %, and
wherein the value $\alpha$ indicating the ductile elongation in terms of proportion is set to 1.24.

4. The bearing device for a wheel according to claim 2, wherein the hub wheel is annealed, and
wherein the value $\alpha$ indicating the ductile elongation in terms of proportion is set to more than 1.24 and 1.5 or less.

5. The bearing device for a wheel according to claim 2, wherein the hub wheel is refined so as to have a crystal grain size of 7 or more, and
wherein the value $\alpha$ indicating the ductile elongation in terms of proportion is set to more than 1.24 and 1.5 or less.

6. The bearing device for a wheel according to claim 1, wherein the hub wheel is formed by using a preform obtained by hot forging of medium carbon steel having a carbon content of from 0.4 to 0.6 mass %, and
wherein the value $\alpha$ indicating the ductile elongation in terms of proportion is set to 1.24.

7. The bearing device for a wheel according to claim 1, wherein the hub wheel is annealed, and
wherein the value $\alpha$ indicating the ductile elongation in terms of proportion is set to more than 1.24 and 1.5 or less.

8. The bearing device for a wheel according to claim 1, wherein the hub wheel is refined so as to have a crystal grain size of 7 or more, and
wherein the value $\alpha$ indicating the ductile elongation in terms of proportion is set to more than 1.24 and 1.5 or less.

9. A manufacturing method for a bearing device for a wheel, the bearing device comprising:
an outer member having double-row outer raceway surfaces formed on an inner circumference thereof;
an inner member comprising:
  a hub wheel having a wheel mounting flange formed thereon; and
  at least one inner race fitted to a small-diameter step portion formed on an outer circumference of the hub wheel,
  the inner member having double-row inner raceway surfaces formed thereon so as to be opposed to the double-row outer raceway surfaces; and
a plurality of rolling elements assembled into spaces between the double-row outer raceway surfaces and the double-row inner raceway surfaces,
the at least one inner race being fixed in an axial direction thereof by a staked portion formed by plastically deforming an end portion of the small-diameter step portion of the hub wheel radially outward,
the staked portion having a face spline formed on an end surface thereof by plastic working,
the manufacturing method comprising forming the staked portion and forming the face spline in one step while satisfying the following relationship:

$$S/M \leq \alpha \times \beta$$

where M represents a mean diameter of an outer diameter and an inner diameter of the end portion of the small-diameter step portion before the forming of the staked portion, S represents an outer diameter of the face spline after the forming of the staked portion, $\alpha$ represents a value indicating ductile elongation of a material for the hub wheel in terms of proportion, and $\beta$ represents a correction coefficient depending on a type of process.

10. The manufacturing method for a bearing device for a wheel according to claim 9,
wherein the forming of the staked portion and the forming of the face spline comprise orbital forming, and
wherein the correction coefficient $\beta$ depending on a type of process is set to 1.15.

11. The manufacturing method for a bearing device for a wheel according to claim 10, further comprising manufacturing the hub wheel by using a preform obtained by hot forging of medium carbon steel containing 0.4 to 0.6 mass % of carbon,
wherein the value $\alpha$ indicating the ductile elongation in terms of proportion is set to 1.24.

12. The manufacturing method for a bearing device for a wheel according to claim 10, further comprising annealing a preform of the hub wheel,
wherein the value $\alpha$ indicating the ductile elongation in terms of proportion is set to more than 1.24 and 1.5 or less.

13. The manufacturing method for a bearing device for a wheel according to claim 10, further comprising refining a preform of the hub wheel so as to have a crystal grain size of 7 or more,
wherein the value $\alpha$ indicating the ductile elongation in terms of proportion is set to more than 1.24 and 1.5 or less.

14. The manufacturing method for a bearing device for a wheel according to claim 9, further comprising manufacturing the hub wheel by using a preform obtained by hot forging of medium carbon steel containing 0.4 to 0.6 mass % of carbon,
wherein the value α indicating the ductile elongation in terms of proportion is set to 1.24.

15. The manufacturing method for a bearing device for a wheel according to claim 9, further comprising annealing a preform of the hub wheel,
wherein the value α indicating the ductile elongation in terms of proportion is set to more than 1.24 and 1.5 or less.

16. The manufacturing method for a bearing device for a wheel according to claim 9, further comprising refining a preform of the hub wheel so as to have a crystal grain size of 7 or more,
wherein the value α indicating the ductile elongation in terms of proportion is set to more than 1.24 and 1.5 or less.

\* \* \* \* \*